Dec. 29, 1953          R. LECOURS          2,663,931
ROTARY CLIPPER HEAD
Filed Aug. 9, 1952                     2 Sheets-Sheet 1
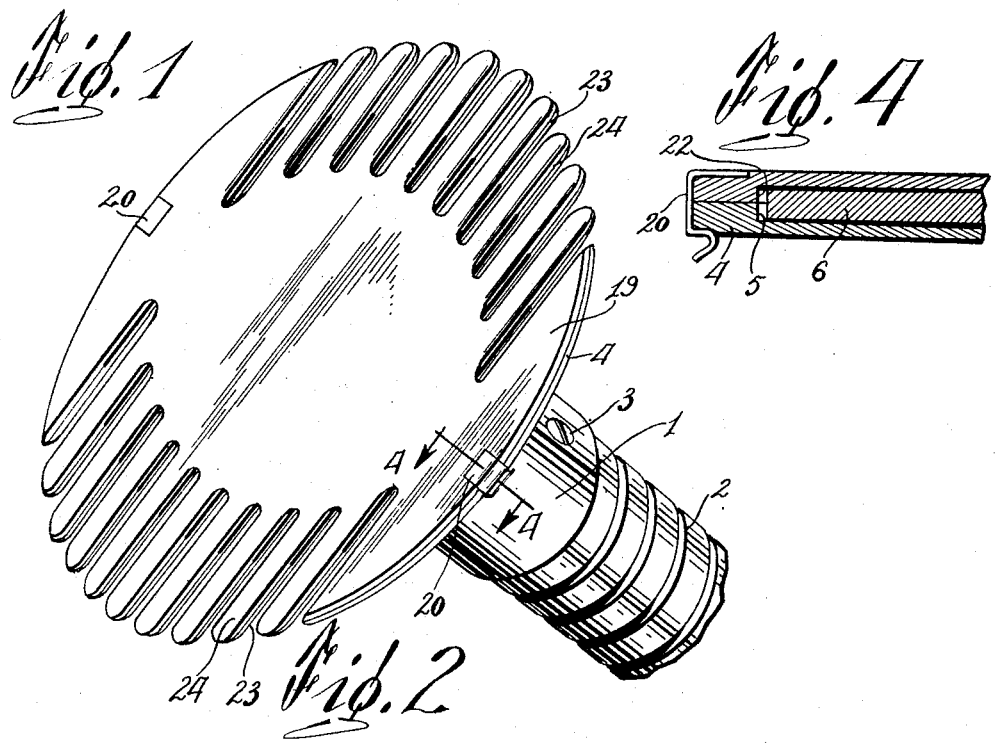
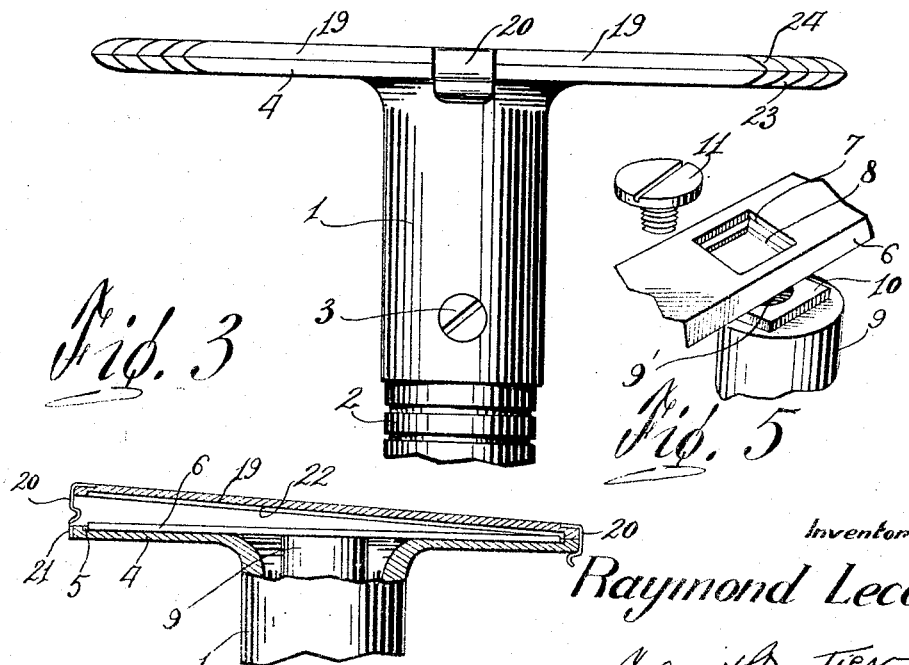
Inventor
Raymond Lecours
Attorneys Dec. 29, 1953
R. LECOURS
2,663,931
ROTARY CLIPPER HEAD
Filed Aug. 9, 1952
2 Sheets-Sheet 2
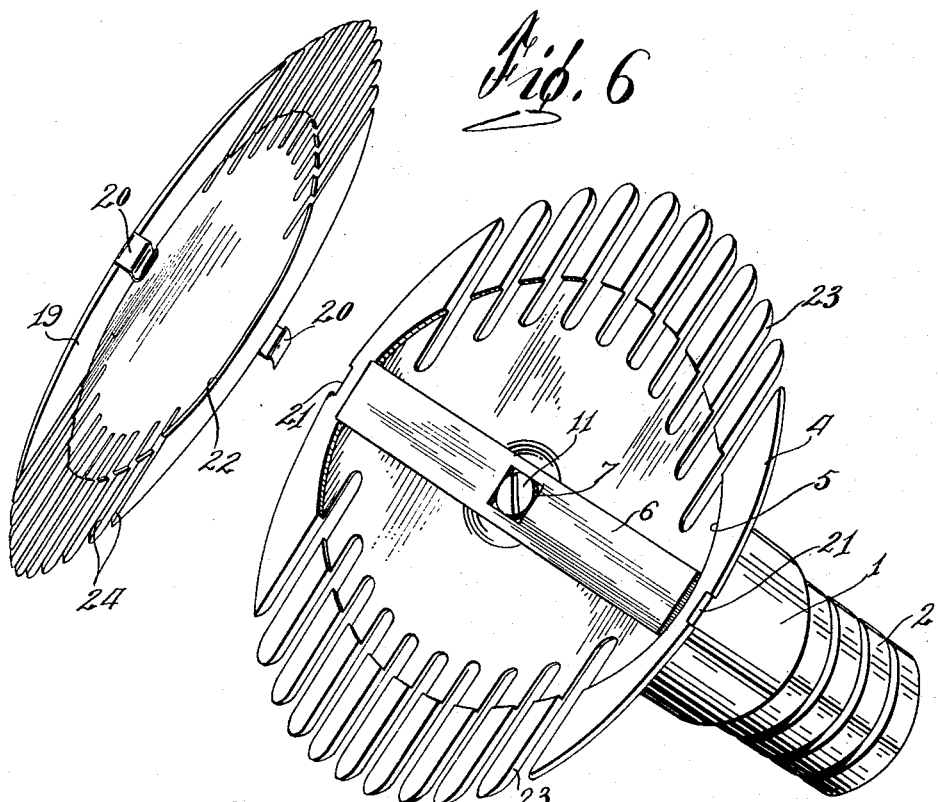
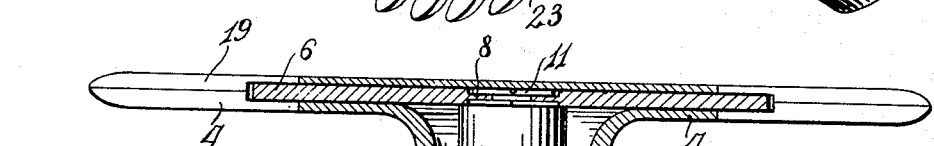
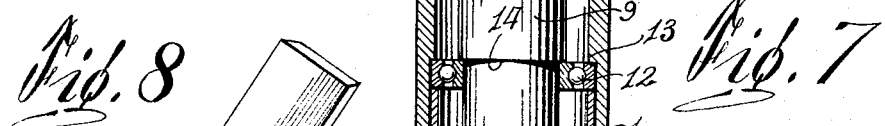
Inventor
Raymond Lecours
Attorneys

UNITED STATES PATENT OFFICE 2,663,931

ROTARY CLIPPER HEAD

Raymond Lecours, St. Laurent, Quebec, Canada

Application August 9, 1952, Serial No. 303,598

5 Claims. (Cl. 30—206)

The present invention relates to a clipper head and more particularly to a rotary clipper head for severing long hairs in a highly effective and safe manner.

Various clipper heads for cutting long hairs have been proposed but they have various disadvantages which prevent their widespread use.

Due to the fact that such clipper heads generally consist of a cutter movable relatively to and in sliding contact with a single shear plate, the hairs to be cut, especially relatively thin or fine tend to bend and get caught between the cutting edges of the cutter and shear plate whereby the clipper becomes jammed.

Moreover, the cutter, rotating at high speed is very often not guarded and may cause serious injuries to the user if brought accidentally in contact with the skin.

Power operated shaving devices are not suitable for cutting long hairs because no provision is made for maintaining the hairs as upright as possible at the moment they are cut.

Moreover known clipper heads of the type described cannot be properly sterilized, sterilization being essential when using such clippers for preparing a skin surface for a surgical intervention.

Accordingly the general object of the present invention is the provision of a rotary clipper head for cutting long hairs which will overcome the above mentioned defects.

An important object of the present invention is the provision of a rotary clipper head which maintains upright the portions of the long hairs which come in contact with the cutter for preventing catching of the hairs between the shear plate and cutter.

Another important object of the present invention is the provision of a rotary clipper head for severing long hairs in which the cutter blade cannot come in contact with the skin to cause injuries thereto.

Still another important object of the present invention is the provision of a rotary clipper head which may reach skinfolds and other closed in areas of the skin.

Yet another object of the present invention is the provision of a clipper head in which the cutter blade is reversible.

Another object of the invention resides in the provision of a rotary clipper head which may be easily and quickly dismounted for cleaning, sterilizing and repairs, and which is relatively simple and inexpensive to manufacture.

The foregoing and other important objects of the present invention will become more apparent during the following disclosure and by referring to the drawings in which:

Figure 1 is a perspective view of the clipper head;

Figure 2 is an elevation of the same;

Figure 3 is a longitudinal section showing the cover plate about to be removed;

Figure 4 is a partial cross-section on line 4—4 of Figure 1;

Figure 5 is a fractional perspective view of the means for attaching the cutter blade to its driving shaft;

Figure 6 is a perspective view of the clipper head with the cover plate removed.

Figure 7 is a longitudinal section of the clipper head; and

Figure 8 is a perspective view of the cutter blade.

Referring now more particularly to the drawings in which like reference characters indicate like elements throughout, the clipper head comprises a sleeve-like housing 1 fitting over a tube 2 depending from an electric motor housing (not shown). A set screw 3 secures the housing 1 onto tube 2. The outer end of housing 1 is bent outwardly to form a right angle oval shaped flange 4 constituting one part of the shear plate of the clipper head.

The central portion of the outer face of the flange 4 is hollowed out to form a circular recess 5 for receiving the rotatable cutter blade 6 which has a rectangular flat shape and which has its flat underface in sliding contact with the bottom surface of the recess 5. The edges of the blade 6 are at right angles to its flat faces.

The blade 6 has a square middle aperture 7 from the center of the sides of which project ribs 8.

The blade 6 is rigidly secured to the outer end of its driving spindle 9 as follows: a square shoulder 10 depending from outer end of the spindle 9 engages aperture 7 of the blade 6 to abut the ribs 8 while a bolt 11 also engages the aperture 7, its head abutting the other side of ribs 8, and threadedly engages a threaded bore 9' made in the spindle 9.

It will be noted that with this arrangement, the cutter 6 may be secured to the spindle 9 in reversed position that is, either one of its flat faces may be disposed in contact with the bottom surface of the recess 5.

Thus the duration of use of the cutter blade is increased because its trailing non cutting edge may become the leading cutting edge by reversing the blade.

The spindle 9 is rotatably centered in the sleeve housing 1 and tube 2 by ball-bearings 12 located between the inner shoulder 13 of housing 1 and the outer end of tube 2 and engaging a shoulder 14 on the spindle 9.

The inner end of the spindle 9 is provided with slots 15 for receiving the lugs 16 of the motor shaft 17 the latter forming a socket 18 surrounding said spindle 9.

Thus the entire clipper head may be disconnected from the motor housing and the motor shaft 17 by simply unscrewing the set screw 3.

A cover plate 19 having the same size and shape as the flange 4 is adapted to be secured to the latter by means of spring clips 20 engageable in notches 21 made on the edge of the flange 4.

The inner face of the cover plate forms a circular recess 22 of the same size as the recess 5 of the flange 4 and registering therewith when said cover plate is in position on the flange 4 so as to define a casing for housing the cutter 6. The upper face of said cutter is in sliding contact with the bottom surface of said recess 22.

The flange 4 and cover plate 19 are provided with a plurality of closely spaced parallel registering slots 23 and 24 respectively made at two opposite portions and extending parallel with the long axis of said flange and cover plate.

These slots 23 and 24 extend inwardly to a distance to intersect the path of the rotating cutter blade 6.

Thus the shear plate constituted by the cover plate 19 and flange 4 forms two comb-like structures adapted to catch and direct the hairs into the slots 23, 24. The hairs are then submitted to the cutting action of the rotating blade 6 while they are maintained upright at two spaced points, that is both above and below the path of the blade.

Similarly the blade will cut the hair at two points due to the shearing action between itself and the edges of the slots 23 and 24.

It will be noted that the flange 4 and cover plate 19 project a substantial distance from the outer surface of the sleeve 1 and that consequently said sleeve 1 does not obstruct the cutting of the long hairs.

It is understood that the cutter 6 may be made thinner at its central portion not registering with the slots 23, 24 so as to decrease the friction between said cutter and the contacting faces of flange 4 and cover plate 19.

While a preferred embodiment according to the invention has been illustrated and described, it is understood that various modifications may be resorted to without departing from the spirit and scope of the appended claims.

What I claim is:

1. In a clipper, a shear plate forming a casing having two spaced opposite inner surface portions and an elongated cutter blade movable between said surface portions and having two opposite faces in sliding shearing contact with said respective surface portions, said shear plate having slots extending thereinto to a distance to intersect the path described by the cutter blade, and means to operate said cutter blade.

2. In a rotary clipper head a shear plate forming a casing having two spaced opposite parallel inner surface portions, and a rectangular shaped cutter blade disposed within said casing and forming two cutting edges extending on the meeting lines of a lateral face with the two opposite faces of said cutter blade, said two cutting edges respectively in shearing contact with said surface portions and said cutter blade rotatable about an axis normal to said shear plate, said shear plate having slots extending thereinto to a distance to intersect the path described by the cutter blade.

3. In a rotary clipper head as claimed in claim 2, a housing depending from one side of said shear plate, a spindle rotatably mounted in said housing to which said cutter blade is rigidly secured, said shear plate and cutter blade projecting a substantial distance beyond the outer surface of said housing.

4. A rotary clipper comprising a sleeve like housing, a flange depending from one end of said housing at substantially right angles, a shaft rotatably mounted in said housing a rectangular shaped cutter blade forming two cutting edges extending on the meeting lines of a lateral face with the two opposite large faces of said cutter blade, said cutter blade rigidly secured to said shaft and having at least a portion of one of its large faces in sliding shearing contact with a surface portion of said flange, a cover plate rigidly secured to said flange over said cutter and having an inner surface portion in sliding shearing contact with at least a portion of the other large face of said cutter blade, said flange and cover plate having aligned slots extending thereinto to a distance to intersect the path of said cutter blade, and means for rotating said shaft and cutter.

5. A rotary clipper as claimed in claim 4, said flange and cover plate contacting along their marginal portion and recessed in their central portion for housing said cutter, and means to removably secure said cover plate to said flange.

RAYMOND LECOURS.

References Cited in the file of this patent

UNITED STATES PATENTS

| Number | Name | Date |
| --- | --- | --- |
| 395,524 | Thayer | Jan. 1, 1889 |
| 1,505,507 | Sukalle | Aug. 19, 1924 |
| 2,014,067 | Heimers | Sept. 10, 1935 |
| 2,365,368 | Verschvyl | Dec. 19, 1944 |
| 2,617,189 | Brown | Nov. 11, 1952 |

FOREIGN PATENTS

| Number | Country | Date |
| --- | --- | --- |
| 498,319 | Great Britain | Jan. 6, 1939 |